(12) United States Patent
Zhu

(10) Patent No.: US 8,873,530 B2
(45) Date of Patent: Oct. 28, 2014

(54) SYSTEM AND METHOD FOR UNIVERSAL WIRELESS DISTRIBUTION

(75) Inventor: Yi Zhu, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 281 days.

(21) Appl. No.: 13/563,614

(22) Filed: Jul. 31, 2012

(65) Prior Publication Data
US 2014/0036892 A1 Feb. 6, 2014

(51) Int. Cl.
H04W 4/00 (2009.01)
(52) U.S. Cl.
USPC .......................................... 370/338
(58) Field of Classification Search
CPC ..... H04W 48/20; H04W 84/12; H04W 88/08; H04W 40/30; H04B 7/0452
USPC ................. 370/310, 312, 328, 338, 401, 445; 455/450, 525, 69
See application file for complete search history.

(56) References Cited

U.S. PATENT DOCUMENTS

| | | | |
|---|---|---|---|
| 7,797,016 B2 * | 9/2010 | Eran et al. ..................... | 455/525 |
| 8,533,345 B2 * | 9/2013 | Fedotenko ..................... | 709/228 |
| 2006/0026870 A1 | 2/2006 | Karhi | |
| 2008/0201763 A1 * | 8/2008 | Lynn et al. ......................... | 726/1 |
| 2008/0317047 A1 * | 12/2008 | Zeng et al. ..................... | 370/401 |
| 2009/0003291 A1 | 1/2009 | Chu et al. | |

FOREIGN PATENT DOCUMENTS

| | | |
|---|---|---|
| EP | 2104292 A1 | 9/2009 |
| EP | 2290880 A1 | 3/2011 |

OTHER PUBLICATIONS

AXIM.com., "Universal Repeater," http://www.aximcom.com/en/technology/universal-repeater.html, pp. 1-2, 2012.
Finn, "A way to standardize 802.11 non-AP stations that are bridge ports," Rev. 3, 802.11 Station Bridges, Cisco, pp. 1-18, http://www.ieee802.org/1/files/public/docs2008/avb-nfinn-802-11-bridging-0308-v3.pdf, Nov. 2008.
ProQuest, "Netgear Launches Prosafe Dual Band Wireless Access Point," Worldwide Videotex, ProQuest document ID: 204364989, pp. 1-3, Feb. 1, 2006.
International Search Report and Written Opinion—PCT/US2013/052233—ISA/EPO—Nov. 11, 2013.

* cited by examiner

Primary Examiner — Raj Jain
(74) Attorney, Agent, or Firm — Bay Area Technology Law Group PC

(57) ABSTRACT

Systems and methods are disclosed to provide a bridge for a wireless distribution system compatible with legacy equipment, including the use of a bridge device having two WLAN modules, with the first WLAN module associating with one or more stations and the second WLAN module configured to associating with a legacy access point. Frames received by the first WLAN module are forwarded to the second WLAN module for transmission and frames received by the second WLAN module are forwarded to the first WLAN module for transmission on the basis of address information in the frames.

20 Claims, 4 Drawing Sheets

SYSTEM AND METHOD FOR UNIVERSAL WIRELESS DISTRIBUTION

FIELD OF THE PRESENT INVENTION

This disclosure generally relates to wireless communication systems and more specifically to systems and methods for providing wireless distribution bridging in networks having legacy equipment.

BACKGROUND OF THE INVENTION

Wireless networks are increasingly employed to provide various communication functions including voice, video, packet data, messaging and the like. A wireless network such as a wireless local area network (WLAN) in a conventional infrastructure configuration comprises a number of nodes, which may include any number of access points (APs) and any number of stations (STAs). Each AP may act as a coordinator for communication with the STAs.

A functional limitation of any WLAN is the transmission and reception range of the AP. For example, the approximate indoor range of a WLAN employing the IEEE 802.11n protocol is 70 m, and may be significantly reduced depending upon the physical environment. Therefore, in order to increase the area served, it may be desirable to extend the range of the WLAN. To accomplish this, a device such as a bridge, having AP-like functionality, may be connected to the network. It may also be desirable for the bridge to be connected wirelessly to avoid the need for cabling. This configuration is analogous to having two (or more) APs that communicate with each other wirelessly, each capable of associating with one ore more client stations (STAs).

IEEE 802.11 standards make certain provisions for the use of wireless bridges in the form of a wireless distribution system (WDS). Under these standards, two or more physically separated APs coordinate operation, such that any STA, or other network node, within range of either AP may communicate over the WLAN. To achieve this functionality, under the 802.11 standards, the header of each frame exchanged over the WLAN includes four distinct addresses, the receiver address, the transmitter address, the destination address and the source address. Provided that the participating APs are configured to properly interpret and process each of the addresses, the use of WDS as specified by 802.11 allows the range of the WLAN to be extended in the intended manner. APs having this capability are termed herein four address (4A) compatible.

However, the provision of four addresses in the frame header is a relatively recent introduction. As such, many currently deployed APs are not 4A compatible, and are termed herein legacy APs. These legacy APs are unable to provide WDS functionality using the mechanisms established by 802.11 standards. Accordingly, even if the bridge device being added to the WLAN is 4A compatible, the presence of any legacy APs that do not have this capability may prevent the intended operation of the WLAN.

Therefore, there remains a need to provide systems and methods for extending the range of a WLAN using a bridge that is compatible with legacy APs. Similarly, there is a need for providing such capabilities without using frame headers that specify four addresses. This invention accomplishes these and other goals.

SUMMARY OF THE INVENTION

In accordance with the above needs and those that will be mentioned and will become apparent below, this specification discloses a wireless bridge device for use with a wireless local area network comprising: a first WLAN module configured to associate with one or more stations, a second WLAN module configured to associate with a legacy access point operating in 3-address mode, and a bridge module operatively connecting the first WLAN module and the second WLAN module, wherein the first WLAN module and the second WLAN module operate in different collision domains and wherein the bridge forwards frames received by the first WLAN module to the second WLAN module for transmission and forwards frames received by the second WLAN module to the first WLAN module for transmission based on address information in the frames.

One embodiment is directed to frames that have a MAC header such that the bridge module is configured to forward frames based upon a destination address in the MAC header. Further, the bridge module may be configured to forward a first frame from the first WLAN module to the second WLAN module when the destination address in the MAC header of the first frame does not match a network address of the first WLAN module or any station associated with the first WLAN module and may be configured to forward a second frame from the second WLAN module to the first WLAN module when the destination address in the MAC header of the second frame matches a network address of the first WLAN module or any station associated with the first WLAN module. In addition, the bridge device may be configured to process frames having address information consisting of the destination address, a source address and a BSSID.

In another embodiment, the first WLAN module and any associated stations are identified with a first BSSID and the legacy AP and any associated stations are identified with a second BSSID, such that the BSSID of the first WLAN module and the BSSID of the legacy AP may be the same.

Yet another aspect relates to configuring the second WLAN module so that it may create a virtual interface for each station associated with the first WLAN module. In such embodiments, each of the stations associated with the first WLAN module has a network address and the second WLAN module may be configured to assign each virtual interface the network address of the corresponding station.

In one embodiment, the wireless bridge device may include a host CPU connected to the first WLAN module and the second WLAN module by a bus interface, wherein the bridge module comprises software instructions performed by the host CPU.

In another embodiment, the first WLAN module may operate on a first frequency and the second WLAN module may operate on a second frequency. Alternatively, the first WLAN module may operate on a first channel of a first frequency and the second WLAN module may operate on a second channel of the first frequency.

This disclosure is also directed to a method for providing a bridge in a wireless local area network that includes the steps of providing a bridge device having a first WLAN module and a second WLAN module, associating the first WLAN module with one or more stations while operating in a first collision domain, associating the second WLAN module with an access point while operating in a second collision domain, wherein the first and second collision domains are different, forwarding frames received by the first WLAN module to the second WLAN module for transmission to the access point, and forwarding frames received by the second WLAN module to the first WLAN module for transmission to any of the stations associated with the first WLAN module, wherein the frames are forwarded on the basis of address information in the frames. In some embodiments, the access point is a legacy access point operating in 3A mode.

In one aspect, each of the frames may include a MAC header such that the frames are forwarded based upon a destination address in the MAC header. Further, forwarding frames from the first WLAN module to the second WLAN module may include forwarding a first frame when the destination address in the MAC header of the first frame does not match a network address of the first WLAN module or any station associated with the first WLAN module and forwarding frames from the second WLAN module to the first WLAN module may include forwarding a second frame when the destination address in the MAC header of the second frame matches a network address of the first WLAN module or any station associated with the first WLAN module.

Further, the first WLAN module and any associated stations and the legacy AP and any associated stations may each be identified with a BSSID, such that the BSSID of the first WLAN module and the BSSID of the legacy AP may be the same.

In another aspect, the methods may include creating a virtual interface in the second WLAN module for each station associated with the first WLAN module. Additionally, each of the stations associated with the first WLAN module may have a network address and each virtual interface may be assigned the network address of the corresponding station.

Yet another embodiment includes the bridge device having a host CPU connected to the first WLAN module and the second WLAN module by a bus interface such that forwarding frames between the first WLAN module and the second WLAN module may include executing software instructions with the host CPU.

In some embodiments, the first WLAN module may operate on a first frequency and the second WLAN module may operate on a second frequency. Alternatively, the first WLAN module may operate on a first channel of a first frequency and the second WLAN module may operate on a second channel of the first frequency.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Figure 1:
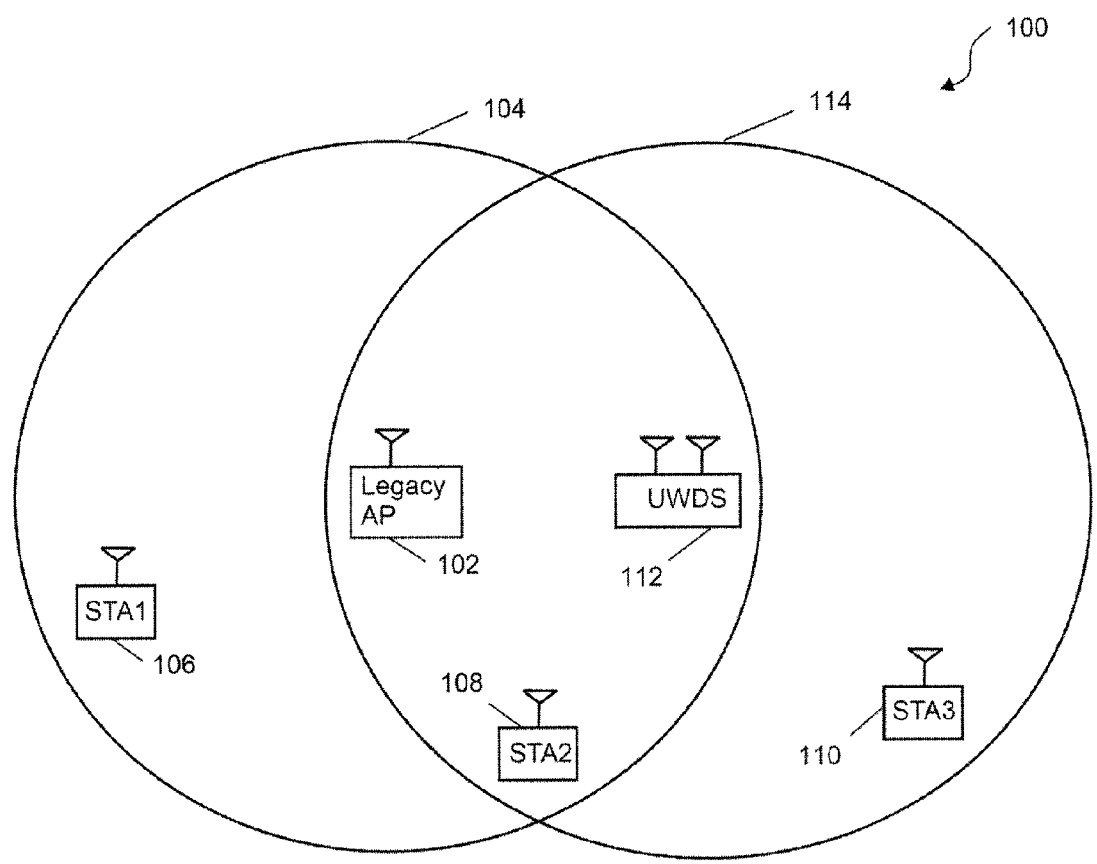
FIG. 1 depicts a wireless communication system, according to one embodiment of the invention.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), and flash memory or any other medium that can be used to store the desired information.

Further, embodiments are discussed in specific reference to wireless networks. As such, this disclosure is applicable to any suitable wireless communication systems having the necessary characteristics. Although discussed in specific reference to an infrastructure WLAN featuring at least an AP and an associated STA, the techniques of this disclosure may be applied to other wireless communication systems or to other network configurations, including ad hoc and STA-to-STA networks, involving a transmitter device and a receiver device. Accordingly, as used herein, the term "station" may mean any node in a wireless communications network having a role equivalent to a conventional station in an 802.11 infrastructure network and likewise, the term "access point" may mean any node having a role equivalent to a conventional access point. Further, these techniques may also be extended to any type of communication system employing shared key cryptography having the requisite characteristics, including wired communication systems.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary wireless network devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The tangible computer-readable data storage medium may form part of a computer program product, which may include packaging materials.

The tangible computer-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise.

As will be discussed in detail below, the techniques of this disclosure are directed to providing wireless distribution system functionality in a WLAN having one or more APs that are not 4A compatible. These techniques include the use of a universal WDS bridge device (UWDS) that features two separate radio modules that operate in different collision domains so that one radio provides the communication link with the legacy AP while the other radio associates with additional client devices that may be outside the range of the legacy AP, thus achieving the desired extension of the WLAN.

Aspects of this disclosure will be described in the context of an exemplary WLAN 100, as shown schematically in FIG. 1. Legacy AP 102 has a range 104, allowing communication with STAT 106 and STA2 108, but not STA3 110. To extend the range of WLAN 100, UWDS 112 may be located within range 104 of legacy AP 102. As will be described below, UWDS 112 simultaneously functions as a STA with respect to legacy AP 102 and as an AP having range 114. Since STA3 110 is within range 114, it may associate with UWDS 112 to join WLAN 100. Further, since STA2 108 is within both range 104 and range 114, it may associate with either legacy AP 102 or UWDS 112.

As known in the art, a STA typically performs association procedures to establish a link with an AP when the STA is first powered up or moves into a new WLAN coverage area. Association refers to the mapping of a STA to an AP, which enables the station to receive distribution service. The association allows the distribution service to know which AP to contact for the STA. An AP and any associated STAs are known as a basic service set (BSS.) For example, legacy AP 102 and any associated STAs form a BSS that may be specified using a BSS identification (BSSID). Similarly, UWDS 112 and any STAs associated with UWDS 112 may also be identified using the same BSSID.

Figure 2:
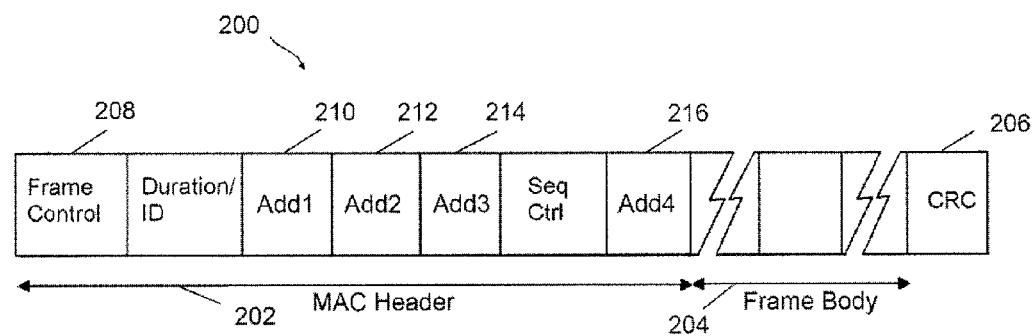
FIG. 2 depicts a generalized format of a transmission frame, according to one embodiment of the invention.

Communication within WLAN 100 is accomplished by the exchange of frames of information between the various nodes. As established by 802.11 standards, these frames are routed between the nodes within WLAN 100 on the basis of address information that may be provided in the media access control (MAC) header of each frame. FIG. 2 depicts the general format of an 802.11 frame. As shown, frame 200 includes a MAC header 202, containing the frame control, duration/ID, address and sequence control fields, a variable length frame body 204 and cyclic redundancy check (CRC) field 206 that provides a frame check sequence (FCS) function. Additional fields, such as a high throughput (HT) field (not shown) may be present depending upon the specific standard being employed.

The aspects of frame 200 related to addressing are the To DS and From DS bits in Frame Control field 208 and the four address fields, Add1 210, Add2 212, Add3 214 and Add4 216. Each address field may be used to identify a specific address including the source address (SA), the destination address (DA), the transmitter address (TA), the receiver address (RA) and the BSS identification (BSSID), depending upon the values of the To DS and From DS bits. The SA represents the network address of the source of the frame. The DA is an individual address for a unicast frame or a group address for a multicast frame representing the ultimate destination of the frame. The BSSID is the network identifier for the BSS in which the frame is being sent. The TA and RA are employed when implementing WDS under 802.11 using all four address fields, wherein the TA refers to the network address of the node that just sent the frame while RA refers to the network address of the node (or nodes) that are the immediate recipient of the frame.

In a typical direct link between an AP and a STA, Add1 210 holds the DA, Add2 212 holds the SA and Add3 214 holds the BSSID. Operation of an AP using these three address fields is termed herein three-address (3A) mode. As such, legacy APs may not be configured to employ Add4 216 and likewise may be unable to function as intended when receiving frames having Add4 216. Accordingly, by using the techniques of this disclosure, UWDS 112 provides bridging functionality to extend the range of WLAN 100 without requiring Add4 216.

In order to provide wireless distribution system functions when operating with legacy AP 102, UWDS 112 may be configured to employ first and second WLAN modules that operate in different collision domains, either by using dual band dual concurrent (DBDC) mode or by using two non-overlapping channels of the same band. For example, one WLAN module may work on the 2.4 GHz frequency band and the other may work on the 5 GHz frequency band. In another example, one WLAN module may work on a first channel in the 2.4 GHz band and the other WLAN module may work on a second channel in the 2.4 GHz band. Preferably, the channels may be selected to minimize the potential for interference, such as by using channel 1 and channel 6. As will be described below, one WLAN module provides the distribution system link with legacy AP 102 while the other WLAN module associates with additional client devices that may be outside the range of the legacy AP 102, such as STA3 110, thus achieving the desired extension of WLAN 100.

Figure 3:
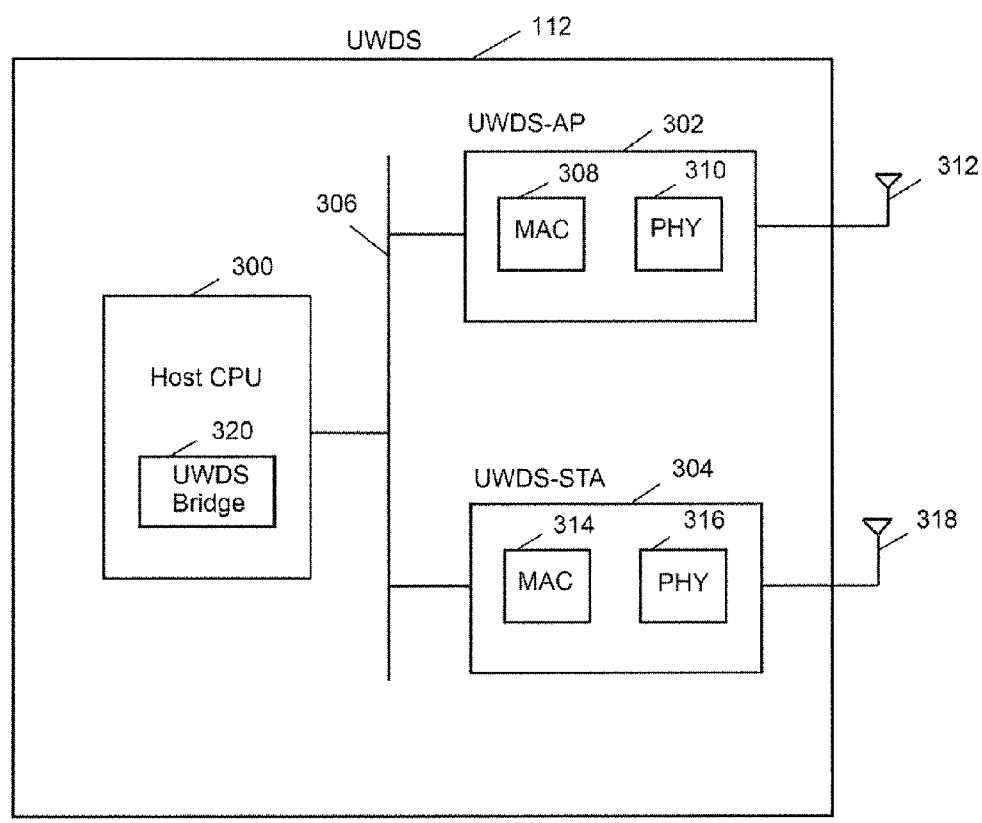
FIG. 3 schematically depicts functional blocks of a universal WDS device, according to one embodiment of the invention.

FIG. 3 schematically depicts functional blocks of one exemplary configuration of UWDS 112. In particular, UWDS 112 as shown includes host CPU 300 capable of performing various computations associated with the operation of the communications device. Host CPU 300 is coupled to WLAN modules UWDS-AP 302 and UWDS-STA 304 through bus interface 306, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. In turn, UWDS-AP 302 generally includes a media access controller (MAC) 308 that may be configured to manage communications between the host CPU 300 and other network nodes over the wireless medium and therefore may include functionalities for the handling and processing frames including verification, acknowledgment, routing, formatting and the like. Incoming and outgoing frames are exchanged between MAC 308 and physical layer (PHY) 310, which as shown here includes the functions of modulating the frames according to the relevant 802.11 protocol as well as providing the analog processing and RF conversion necessary to provide transmission and reception of wireless signals over antenna 312. Likewise, UWDS-STA 304 may also include a MAC 314, PHY 316 and antenna 318 to provide similar functionality.

As shown, UWDS-AP 302 and UWDS-STA 304 are coupled through a network bridge module, UWDS Bridge 320. In the embodiment shown, UWDS Bridge 320 may be implemented though a set of software instructions running on host CPU 300, wherein UWDS-AP 302, UWDS-STA 304 and UWDS Bridge 320 communicate over bus interface 306. However, one of skill in the art will recognize that equivalent functionality may be achieved by employing any interconnect between UWDS-AP 302 and UWDS-STA 304 managed by a bridge controller, implemented as any suitable combination of hardware and software.

Figure 4:
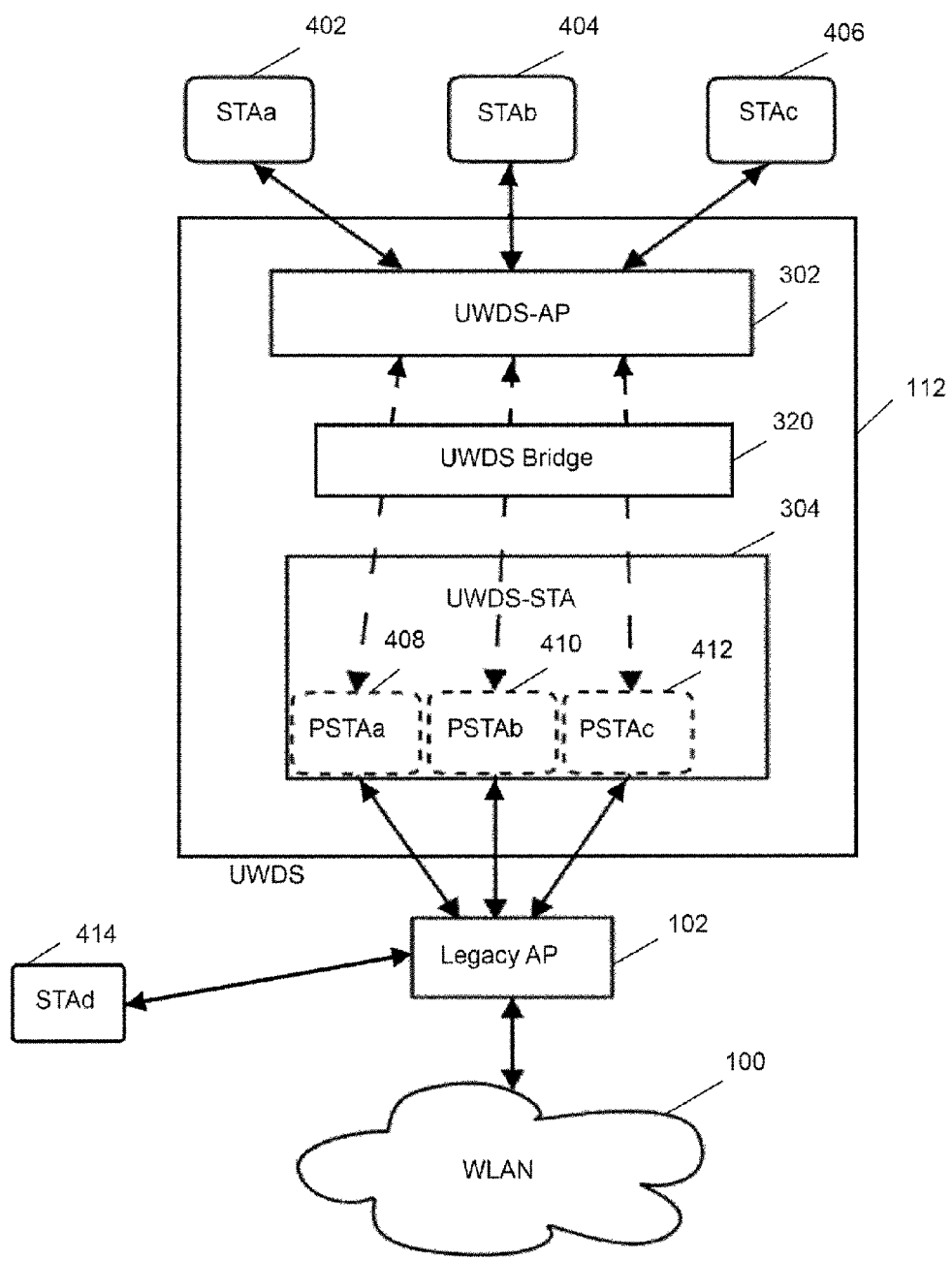
FIG. 4 schematically depicts connections between a universal WDS device, a legacy AP and associated STAs, according to one embodiment of the invention.

Operation of UWDS 112 to control the flow of frames within WLAN 100 is shown schematically in FIG. 4. UWDS-STA 304 associates as a client device with legacy AP 102 at the frequency and channel dictated by legacy AP 102. UWDS-AP 302 may be configured to function as a normal AP, associating with client devices STAa 402, STAb 404 and STAc 406 as shown, for example. As noted above, UWDS-AP 302 operates either on a different frequency or on a non-overlapping channel than UWDS-STA 304. Both UWDS-STA 304 and UWDS-AP 302 may be configured to use the same BSSID.

As shown, for every STA associated with UWDS-AP 302, a virtual STA interface (VAP) may be created by UWDS-STA 304 and associated to legacy AP 102 as a separate STA. As will be appreciated, one or more VAPs may be attached to a physical WLAN interface, UWDS-STA 304, allowing each VAP to be treated as an independent network entity.

These virtual interfaces are preferably configured to serve as proxy STAs in association with UWDS-STA 304, and are shown respectively as PSTAa 408, PSTAb 410 and PSTAc 412. In one aspect, each STA and PSTA pair may share the same MAC address. However, it will be appreciated that this configuration does not cause radio level interference as UWDS-AP 302 and UWDS-STA 304 are not operating on the same frequency or channel. As a result, a frame sent to a STAa 402, for example, by legacy AP 102 may be acknowledged by PSTAa 408, but not by the corresponding STA, STAa 402, as the PSTA will receive the frame but the STA will not. Similarly, a frame sent to a STA by the UWDS-AP will be acknowledged by the STA, but not by the PSTA created in the UWDS-STA.

Figure 5:
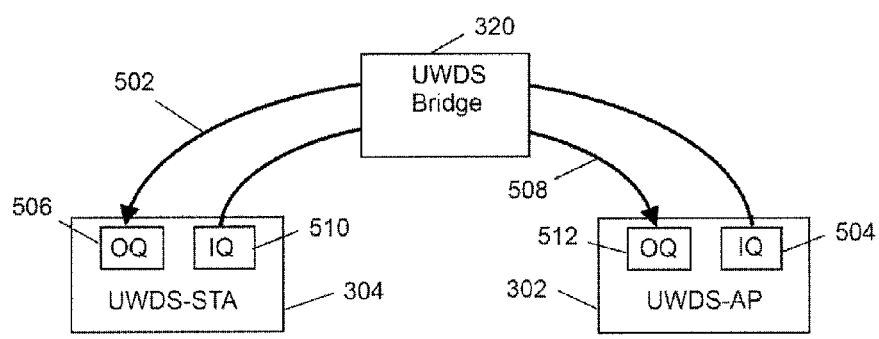
FIG. 5 schematically depicts the transfer of frames between first and second WLAN modules of a universal WDS device as managed by a bridge module, according to one embodiment of the invention.

UWDS-AP 302 and all UWDS-STA PSTAs, including PSTAa 408, PSTAb 410 and PSTAc 412 may be added as member interfaces to UWDS Bridge 320. FIG. 5 schematically illustrates the transfer of frames between UWDS-AP 302 and UWDS-STA 304 as controlled by UWDS Bridge 320. As indicated by directional flow 502, UWDS Bridge 320 transfers incoming frames received by UWDS-AP 302 to UWDS-STA 304 for transmission. In the embodiment shown, UWDS Bridge 320 filters the MAC headers of incoming frames held in a buffer, such as incoming queue (IQ) 504 of MAC 308. Any frames having a header with a DA in Add 1 210 that does not match either the UWDS-AP 302 network address or the network address of any associated clients, such as STAa 402, STAb 404 and STAc 40 are transferred to output queue (OQ) 506 of UWDS-STA 304 in MAC 314. UWDS-AP 302 may subsequently transmit these frames to be received and processed by its associated STAs. Similarly, directional flow 508 indicates that UWDS Bridge 320 also transfers incoming frames received by UWDS-STA 304 to UWDS-AP 302 for transmission. Here, filtering of the MAC Headers of incoming frames held in IQ 510 of UWDS-STA 304 identifies frames having a header specifying a DA that matches the network address of the clients associated with UWDS-AP 302, such as STAa 402, STAb 404 and STAc 406. UWDS Bridge 320 then transfers these frames to output queue (OQ) 512 of UWDS-AP 302 for transmittal to the associated clients, such as STAa 402, STAb 404 and STAc 406.

One of skill in the art will recognize that any number and combination of buffers, queues or other memory elements, as well as other storage configurations may be employed involving memory blocks specific to MAC 308 or shared with other components of the device, such as host CPU 300. In a further aspect, access to stored frames may be achieved using a direct memory access (DMA) configuration.

Accordingly, the UWDS provides the desired bridging function with frames using three address MAC addressing and may correspondingly be used in WLANs having one or more APs operating in 3A mode, such as legacy AP 102. As discussed above, in addition to the DA, MAC headers for frames being transferred in a direct link may also include the SA and the BSSID. The flow of frames through UWDS 112 may be seen in reference to FIG. 4. For example, a frame received by UWDS-AP 302 from STAa 402 having a destination that may be routed through legacy AP 102, such as frames intended for STAd 414, will have a DA in its MAC header that is not addressed to STAa 402, STAb 404, STAc 406 or UWDS-AP 302. Such frames are transferred by UWDS Bridge 320 to UWDS-STA 304 for transmittal to legacy AP 102, where they may be received and processed conventionally for subsequent retransmittal to their destination. On the other hand, a frame received by UWDS-AP 302 that is addressed to STAa 402, STAb 404, STAc 406 or UWDS-AP 302 may also be processed conventionally by UWDS-AP 302. In the complementary process, a frame destined for one of the STAs associated with UWDS-AP 302 that is received by legacy AP 102, such as a frame sent by STAd 414 for STAa 402, may be transmitted by legacy AP 102 to the appropriate VAP of UWDS-STA 304, such as PSTAa 408 in this example. UWDS Bridge 320 then transfers the frame to UWDS-AP 302 which may transmit it to its intended destination, such as STAa 402.

As will be appreciated from the material above, the implementations of this disclosure offer backward compatibility with legacy APs by providing range extension without requiring that the legacy APs support the 4A mode. The use of two separate WLAN modules has the additional benefit of providing greater throughput than a single radio bridge operating in 4A mode because the two radios are in different collision domains and can operate simultaneously.

Described herein are presently preferred embodiments. However, one skilled in the art that pertains to the present invention will understand that the principles of this disclosure can be extended easily with appropriate modifications to other applications.

What is claimed is:

1. A wireless bridge device for use with a wireless local area network comprising:
   a) a first WLAN module configured to associate with one or more stations;
   b) a second WLAN module configured to associate with a legacy access point (AP) operating in 3-address mode; and
   c) a bridge module operatively connecting the first WLAN module and the second WLAN module;
   wherein the first WLAN module and the second WLAN module operate in different collision domains and wherein the bridge module forwards frames received by the first WLAN module to the second WLAN module for transmission and forwards frames received by the second WLAN module to the first WLAN module for transmission based on address information in the frames.

2. The wireless bridge device of claim 1, wherein each of the frames comprises a MAC header and wherein the bridge module is configured to forward frames based upon a destination address in the MAC header.

3. The wireless bridge device of claim 2, wherein the bridge module is configured to forward a first frame from the first WLAN module to the second WLAN module when the destination address in the MAC header of the first frame does not match a network address of the first WLAN module or any station associated with the first WLAN module and wherein the bridge module is configured to forward a second frame from the second WLAN module to the first WLAN module when the destination address in the MAC header of the second frame matches a network address of the first WLAN module or any station associated with the first WLAN module.

4. The wireless bridge device of claim 2, wherein the wireless bridge device is configured to process frames having address information consisting of the destination address, a source address and a BSSID.

5. The wireless bridge device of claim 1, wherein the first WLAN module and any associated stations are identified with a BSSID, wherein the legacy AP and any associated stations are identified with a BSSID, and wherein the BSSID of the first WLAN module and the BSSID of the legacy AP are the same.

6. The wireless bridge device of claim 1, wherein the second WLAN module is further configured to create a virtual interface for each station associated with the first WLAN module.

7. The wireless bridge device of claim 6, wherein each of the stations associated with the first WLAN module has a network address and wherein the second WLAN module is configured to assign each virtual interface the network address of the corresponding station.

8. The wireless bridge device of claim 1, further comprising a host CPU connected to the first WLAN module and the second WLAN module by a bus interface, wherein the bridge module comprises software instructions performed by the host CPU.

9. The wireless bridge device of claim 1, wherein the first WLAN module operates on a first frequency and the second WLAN module operates on a second frequency.

10. The wireless bridge device of claim 1, wherein the first WLAN module operates on a first channel of a first frequency and the second WLAN module operates on a second channel of the first frequency.

11. A method for providing a bridge in a wireless local area network comprising:
    a) providing a bridge device having a first WLAN module and a second WLAN module;
    b) associating the first WLAN module with one or more stations while operating in a first collision domain;
    c) associating the second WLAN module with an access point (AP) while operating in a second collision domain, wherein the first and second collision domains are different;
    d) forwarding frames received by the first WLAN module to the second WLAN module for transmission to the access point; and
    e) forwarding frames received by the second WLAN module to the first WLAN module for transmission to any of the stations associated with the first WLAN module,
    wherein the frames are forwarded on the basis of address information in the frames.

12. The method of claim 11, wherein each of the frames comprises a MAC header and wherein the frames are forwarded based upon a destination address in the MAC header.

13. The method of claim 12, wherein forwarding frames from the first WLAN module to the second WLAN module comprises forwarding a first frame when the destination address in the MAC header of the first frame does not match a network address of the first WLAN module or any station associated with the first WLAN module and wherein forwarding frames from the second WLAN module to the first WLAN module comprises forwarding a second frame when the destination address in the MAC header of the second frame matches a network address of the first WLAN module or any station associated with the first WLAN module.

14. The method of claim 12, wherein the second WLAN module is associated with a legacy AP operating in 3A mode.

15. The method of claim 11, wherein the first WLAN module and any associated stations are identified with a BSSID, wherein the AP and any associated stations are identified with a BSSID, and wherein the BSSID of the first WLAN module and the BSSID of the AP are the same.

16. The method of claim 11, further comprising creating a virtual interface in the second WLAN module for each station associated with the first WLAN module.

17. The method of claim 16, wherein each of the stations associated with the first WLAN module has a network address and wherein each virtual interface is assigned the network address of the corresponding station.

18. The method of claim 11, wherein the bridge device further comprises a host CPU connected to the first WLAN module and the second WLAN module by a bus interface and wherein forwarding frames between the first WLAN module and the second WLAN module comprises executing software instructions with the host CPU.

19. The method of claim 11, wherein the first WLAN module operates on a first frequency and the second WLAN module operates on a second frequency.

20. The method of claim 11, wherein the first WLAN module operates on a first channel of a first frequency and the second WLAN module operates on a second channel of the first frequency.

* * * * *